(12) United States Patent
You et al.

(10) Patent No.: US 8,325,305 B2
(45) Date of Patent: Dec. 4, 2012

(54) METHOD OF DRIVING A LIQUID CRYSTAL DISPLAY APPARATUS, ARRAY SUBSTRATE FOR PERFORMING THE METHOD, METHOD OF MANUFACTURING THE ARRAY SUBSTRATE, AND A LIQUID CRYSTAL DISPLAY APPARATUS HAVING THE ARRAY SUBSTRATE

(75) Inventors: Hye-Ran You, Incheon (KR); Jae-Jin Lyu, Yongin-si (KR); Seung-Beom Park, Seoul (KR); Yoon-Sung Um, Yongin-si (KR)

(73) Assignee: Samsung Display Co., Ltd. (KR)

( * ) Notice: Subject to any disclaimer, the term of this patent is extended or adjusted under 35 U.S.C. 154(b) by 424 days.

(21) Appl. No.: 12/498,600

(22) Filed: Jul. 7, 2009

(65) Prior Publication Data

US 2010/0007809 A1    Jan. 14, 2010

(30) Foreign Application Priority Data

Jul. 8, 2008   (KR) .................... 10-2008-0065987

(51) Int. Cl.
  *G02F 1/1337*   (2006.01)

(52) U.S. Cl. ........... 349/129; 349/38; 349/139; 349/138
(58) Field of Classification Search ............. 349/37, 349/129, 139, 141, 143, 43, 38, 33, 39, 138, 349/114, 113
See application file for complete search history.

(56) References Cited

U.S. PATENT DOCUMENTS

| | | | | |
|---|---|---|---|---|
| 7,352,425 B2* | 4/2008 | Ono et al. | | 349/141 |
| 7,443,477 B2* | 10/2008 | Lin et al. | | 349/141 |
| 7,636,144 B2* | 12/2009 | Horiguchi et al. | | 349/141 |
| 7,710,523 B2* | 5/2010 | Nakanishi et al. | | 349/129 |
| 7,742,117 B2* | 6/2010 | Lee et al. | | 349/39 |
| 2007/0146608 A1* | 6/2007 | Jin et al. | | 349/143 |

\* cited by examiner

*Primary Examiner* — Thoi Duong
(74) *Attorney, Agent, or Firm* — Cantor Colburn LLP

(57) ABSTRACT

In a method of driving a liquid crystal display ("LCD") apparatus, a common voltage is applied to a common electrode above a liquid crystal layer and pixel voltages are applied to pixel electrodes under the liquid crystal layer to form an electrical field with the common electrode to control movements of liquid crystal molecules of the liquid crystal layer. Each of the pixel electrodes has slits. Then, a supplementary voltage is applied to a supplementary electrode between the slits of each pixel electrode to compensate the electric field formed by the pixel electrodes and the common electrode.

9 Claims, 18 Drawing Sheets

METHOD OF DRIVING A LIQUID CRYSTAL DISPLAY APPARATUS, ARRAY SUBSTRATE FOR PERFORMING THE METHOD, METHOD OF MANUFACTURING THE ARRAY SUBSTRATE, AND A LIQUID CRYSTAL DISPLAY APPARATUS HAVING THE ARRAY SUBSTRATE

This application claims priority to Korean Patent Application No. 2008-65987, filed on Jul. 8, 2008, and all the benefits accruing therefrom under 35 U.S.C. §119, the contents of which in its entirety are herein incorporated by reference.

BACKGROUND OF THE INVENTION

1. Field of the Invention

Embodiments of the present invention relate to a method of driving a liquid crystal display ("LCD") apparatus, an array substrate for performing the method, a method of manufacturing the array substrate, and an LCD apparatus having the array substrate. More particularly, embodiments of the present invention relate to a method of driving an LCD apparatus capable of improving display quality, an array substrate for performing the method, a method of manufacturing the array substrate, and an LCD apparatus having the array substrate.

2. Description of the Related Art

A liquid crystal display ("LCD") is a type of flat panel display device and is widely used. The LCD includes two display substrates and a liquid crystal layer interposed between the two display substrates. The two substrates respectively have a pixel electrode and a common electrode for forming an electric field. When the pixel electrode and the common electrode respectively receive voltages, the electric field is applied to the liquid crystal layer. Liquid crystal molecules in the liquid crystal layer are arranged based on the electric field and the arrangements of the liquid crystal molecules control an amount of light passing through the liquid crystal layer, so that the LCD may display an image.

In a vertical alignment ("VA") LCD, a longitudinal axis of the liquid crystal molecule is vertically arranged with respect to the display substrates. The VA LCD having a large contrast ratio is widely used. In order to improving the viewing angle of the VA LCD, a patterned vertical alignment ("PVA") LCD has been developed. In the PVA LCD, the pixel electrode and/or the common electrode may be patterned in order to improve the viewing angle.

Generally, a mobile PVA ("mPVA") LCD employs a circular polarization mode having high transmissivity or a linear polarization mode having high visibility and a high contrast ratio.

In the mPVA LCD, since the size of a pixel is small, the mPVA LCD requires a high aperture ratio and a predetermined arrangement of the liquid crystal in which an angle between the orientation axis of the liquid crystal and a polarization axis of a polarization plate may be about 45°.

In the mPVA LCD, slits are formed in the common electrode of a color filter substrate and the pixel electrode of an array substrate to improve the viewing angle. In the mPVA LCD, a ratio of an area between the slits to the pixel area is relatively large.

BRIEF SUMMARY OF THE INVENTION

It has been determined herein, according to exemplary embodiments of the present invention, that the liquid crystal in a space between the slits in a mobile patterned vertical alignment liquid crystal display ("mPVA LCD") may not be controlled so that the transmissivity may be reduced.

Embodiments of the present invention provide a method of driving a liquid crystal display ("LCD") apparatus capable of improving display quality.

Embodiments of the present invention also provide an array substrate for performing the method of the driving the LCD apparatus.

Embodiments of the present invention further provide a method of manufacturing the array substrate.

Embodiments of the present invention still further provide an LCD apparatus having the array substrate.

According to exemplary embodiments of the present invention, there is provided a method of driving an LCD apparatus. In the method of driving the LCD apparatus, a common voltage is applied to a common electrode above a liquid crystal layer and pixel voltages are applied to pixel electrodes under the liquid crystal layer to form an electrical field with the common electrode to control movements of liquid crystal molecules of the liquid crystal layer. Each of the pixel electrodes has slits. Then, a supplementary voltage is applied to a supplementary electrode between the slits of each pixel electrode to compensate the electric field formed by the pixel electrodes and the common electrode.

In an exemplary embodiment of the present invention, the pixel electrodes may be driven by a row-inversion method and the supplementary electrode may receive the supplementary voltage having a phase which is inverted according to rows of the pixel electrodes to correspond to the pixel voltage.

In other exemplary embodiments of the present invention, the pixel electrodes may be driven by a column-inversion method and the supplementary electrodes connected according to columns of the pixel electrodes may receive the supplementary voltage having a phase which is identical to a phase of the pixel voltage.

In further other exemplary embodiments of the present invention, the pixel electrodes may be driven by a dot-inversion method and the supplementary electrode may receive the supplementary voltage having a phase which is inverted by the dot-inversion method.

Each of the pixel electrodes may include a plurality of sub-pixel electrodes. The supplementary electrode may include a plurality of sub-supplementary electrodes corresponding to the sub-pixel electrodes. The sub-pixel electrodes may respectively receive the pixel voltages that have a same phase. The sub-supplementary electrodes may respectively receive the supplementary voltages that include a first supplementary voltage having a first phase and a second supplementary voltage having a second phase that is inverted with respect to the first phase.

According to exemplary embodiments of the present invention, there is provided an array substrate. The array substrate includes a substrate, a pixel electrode and a supplementary electrode. The substrate may have a gate line, a data line and a switching element electrically connected to the gate line and the data line. The pixel electrode may be disposed in a pixel area of the substrate and electrically connected to the switching element. The pixel electrode may include a connection part dividing the pixel area into a plurality of domains and slits extending from the connection part. The supplementary electrode may correspond to at least a space between the slits of the pixel electrode.

The array substrate may further include a first insulation layer formed on the data line and the switching element and a second insulation layer formed on the first insulation layer.

The supplementary electrode may be formed on the first insulation layer and the pixel electrode may be formed on the second insulation layer.

The array substrate may further include an organic insulation layer formed between the first insulation layer and the second insulation layer and the supplementary electrode may be formed between the organic insulation layer and the second insulation layer. The supplementary electrode may be formed in the pixel area and have a plate shape. The supplementary electrode may extend along a portion of a side portion of the pixel area along which end portions of the slits are arranged.

The supplementary electrode and the gate line may be formed from a same layer on an upper surface of the substrate.

The supplementary electrode may be integrally formed with the pixel electrode and connect end portions of the slits with one another.

According to exemplary embodiments of the present invention, there is provided a method of manufacturing an array substrate. In the method of manufacturing the array substrate, a switching element is formed on a substrate. Then, a pixel electrode electrically connected to the switching element is formed in a pixel area of the substrate. The pixel electrode may include a connection part dividing the pixel area into a plurality of domains and slits extending from the connection part. Then, a supplementary electrode corresponding to at least a space between the slits may be formed.

A first insulation layer may be further formed on the switching element, with the supplementary electrode formed on the first insulation layer, and a second insulation layer may be further formed between the supplementary electrode and the pixel electrode.

An organic insulation layer may be further formed between the supplementary electrode and the first insulation layer, before forming the supplementary electrode on the first insulation layer.

The supplementary electrode may extend along at least a portion of a side portion of the pixel area to connect end portions of the slits.

The supplementary electrode and a gate electrode of the switching element may be formed from a same layer on the substrate.

According to exemplary embodiments of the present invention, there is provided an LCD apparatus. The LCD apparatus includes a first substrate, a liquid crystal layer and a second substrate.

The first substrate may include an upper substrate and a common electrode on a under surface of the upper substrate. The liquid crystal layer may be under the common electrode. The second substrate may include a lower substrate opposite to the upper substrate, a pixel electrode in a pixel area of the lower substrate, and a supplementary electrode corresponding to at least a space between the slits and applying an electrical field to a portion of the liquid crystal layer in the space between the slits. The liquid crystal layer may be disposed between the upper substrate and the lower substrate. The pixel electrode may include a connection part dividing the pixel area into a plurality of domains and slits extending from the connection part.

The second substrate may further include a first insulation layer formed between the switching element and the supplementary electrode and a second insulation layer formed between the supplementary electrode and the pixel electrode. The supplementary electrode may be formed in the pixel area and have a plate shape. The supplementary electrode may extend along at least a portion of a side portion of the pixel area to electrically connect end portions of the slits.

The supplementary electrode may be integrally formed with the pixel electrode and extends along at least a portion of a side portion of the pixel area to electrically connect end portions of the slits.

The LCD apparatus may further include a driver applying a pixel voltage to the pixel electrode and a supplementary voltage to the supplementary electrode, the supplementary voltage forming the electric field applied to the portion of the liquid crystal layer in the space between the slits.

In an exemplary embodiment of the present invention, the driver may apply pixel voltages which have opposite phases to each other to adjacent pixel electrodes, respectively, and apply supplementary voltages having phases which are the same as the pixel voltages to corresponding supplementary electrodes.

In another exemplary embodiment of the present invention, the driver may apply pixel voltages which have a same phase to adjacent pixel electrodes, respectively, and apply the supplementary voltages having opposite phases to each other to corresponding supplementary electrodes to the adjacent pixel electrodes.

According to the method of driving the LCD apparatus, the array substrate, the method of manufacturing the array substrate, and the LCD apparatus, a supplementary electrode may effectively arrange a portion of liquid crystal in a space between slits of a pixel electrode. Therefore, the aperture ratio of a pixel area and the viewing angle of the LCD apparatus may be improved so that the LCD apparatus may display improved images.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
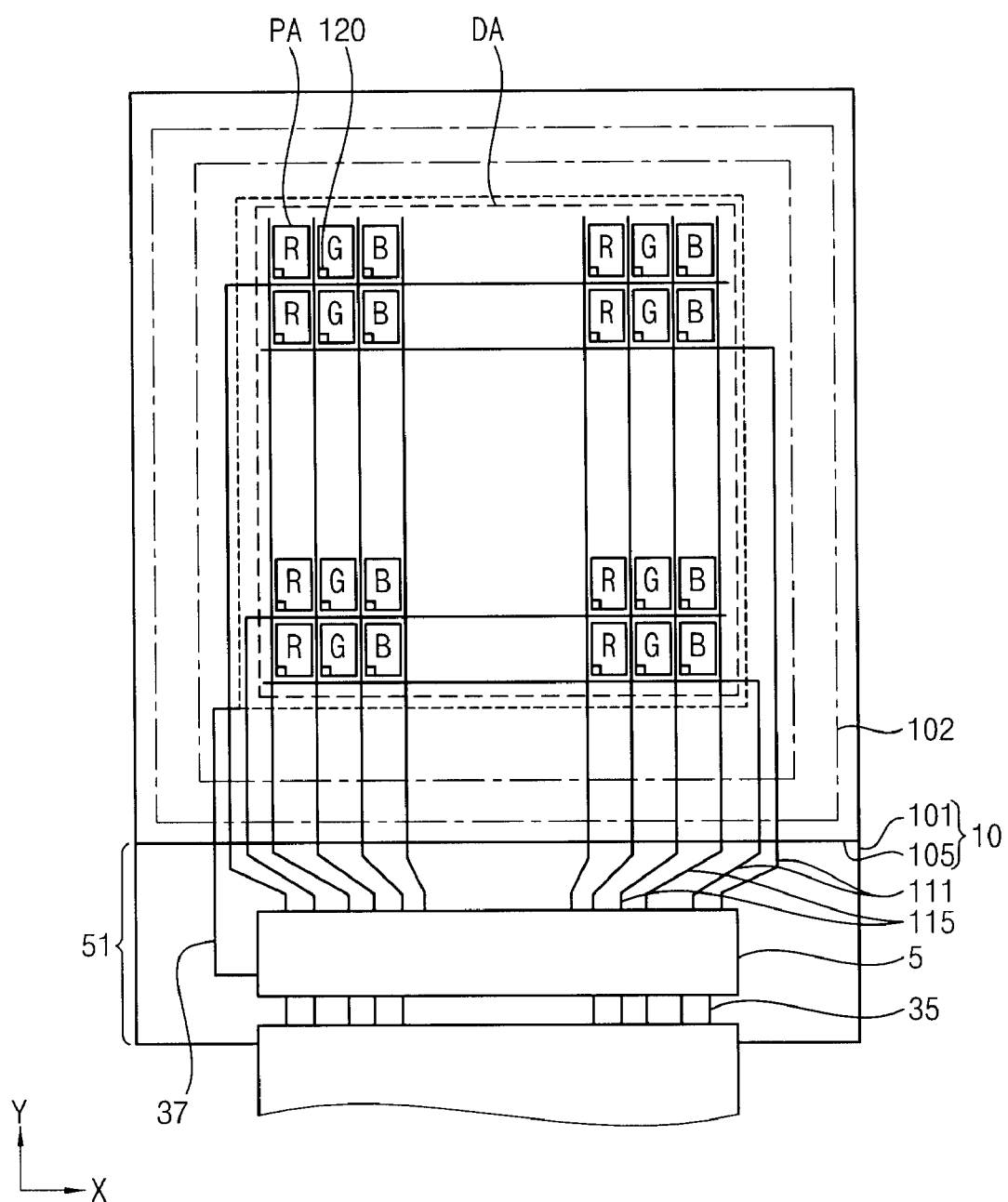
FIG. 1 is a plan view illustrating an exemplary liquid crystal display ("LCD") apparatus in accordance with Embodiment 1 of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Embodiment 1

FIG. 1 is a plan view illustrating a liquid crystal display ("LCD") apparatus in accordance with Embodiment 1 of the present invention.

Referring to FIG. 1, an LCD apparatus 100 includes a display panel 10 and a driver 5.

The display panel 10 includes an array substrate 101, an opposing substrate 105 and a liquid crystal layer. The array substrate 101 and the opposing substrate 105, which face each other, are combined with each other by a sealing member 102. A space defined by the array substrate 101, the opposing substrate 105 and the sealing member 102 is filled with liquid crystal to form the liquid crystal layer 107, as will be further described with respect to FIG. 3. Area 51 of the display panel 10 may include an area of the array substrate 101 not overlapped by the opposing substrate 105 and may be an area on which the driver 5 is formed. The display panel 10 includes a display area DA. The display area DA may include a plurality of pixel areas PA.

The opposing substrate 105 may include a color filter substrate having color filters. The color filters may include a red color filter, a green color filter and a blue color filter. The array substrate 101 may include a switching element 108, as will be further described below with respect to FIG. 3, and be driven by a matrix driving method using the switching element 108.

In addition, the array substrate 101 includes a pixel electrode 171, as will be described with respect to FIG. 2, and the opposing substrate 105 includes a common electrode 190, as will be described with respect to FIG. 3.

The array substrate 101 may have a substantially rectangular shape. Hereinafter, a width direction of the array substrate 101 is referred to as an x direction, and a length direction of the array substrate 101 is referred to as a y direction.

Figure 2:
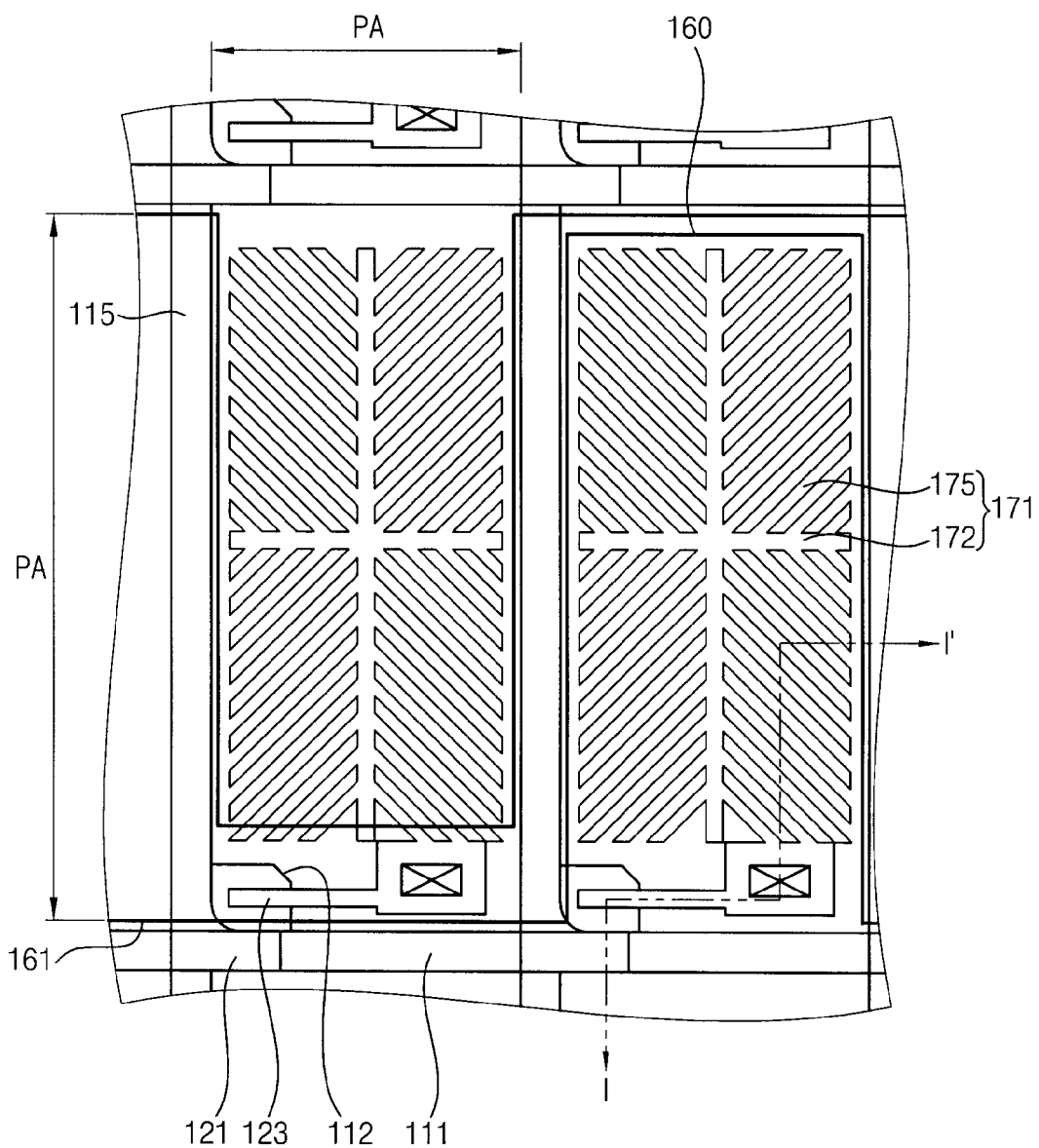
FIG. 2 is an enlarged plan view illustrating exemplary pixel areas illustrated in FIG. 1.

FIG. 2 is an enlarged plan view illustrating exemplary pixel areas illustrated in FIG. 1. FIG. 3 is a cross-sectional view taken along line I-I' shown in FIG. 2.

Figure 3:
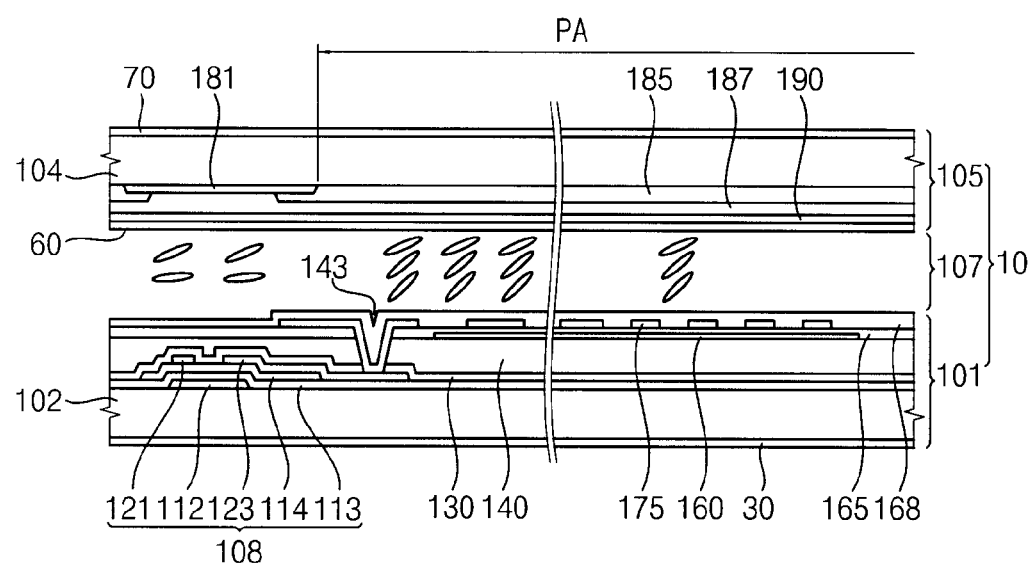
FIG. 3 is a cross-sectional view taken along line I-I' shown in FIG. 2.

For the sake of convenience, FIG. 2 only shows a portion of the array substrate 101 and FIG. 3 shows a portion of the display panel 100 corresponding to the portion of the array substrate 101 illustrated in FIG. 2.

Referring to FIGS. 1 to 3, the array substrate 101 includes a lower substrate 102, a plurality of gate lines 111, a plurality of data lines 115, a plurality of switching elements 108, a supplementary electrode 160, and a pixel electrode 171.

FIGS. 4A to 4I are cross-sectional views illustrating an exemplary method of manufacturing an exemplary array substrate illustrated in FIGS. 1 to 3.

Figure 4A:
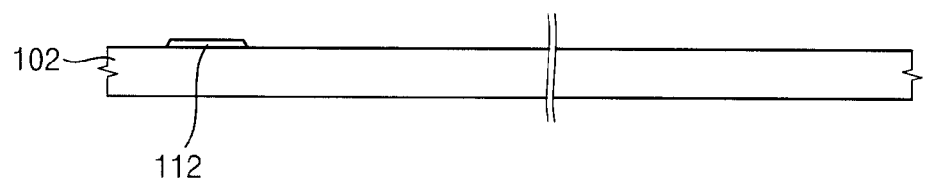
FIGS. 4A to 4I are cross-sectional views illustrating an exemplary method of manufacturing an exemplary array substrate illustrated in FIGS. 1 to 3.

In the exemplary method of manufacturing the array substrate 101, a gate metal layer is formed on the lower substrate 102 such as by a sputtering method. The gate metal layer may include a two-layer structure which has an aluminum (Al) layer and a molybdenum (Mo) layer. The gate metal layer may have a thickness of about 3,000 Å. As illustrated in FIG. 4A, the gate metal layer is patterned by a photo-etching method to form the gate lines 111 and the gate electrodes 112 protruding from the gate lines 111. The gate lines 111 extend in the x direction to be parallel with one another.

Figure 4B:
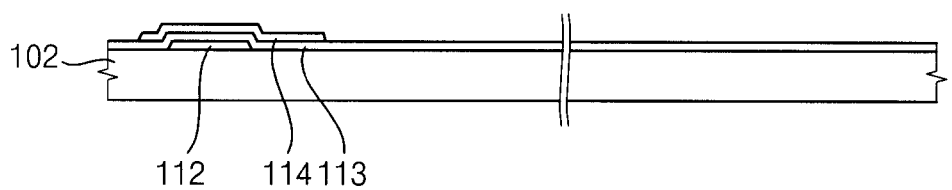

Then, as illustrated in FIGS. 2 and FIG. 4B, a gate insulation layer 113 and a semiconductor pattern 114 are formed. The gate insulation layer 113 is formed on the gate lines 111 and on the exposed portions of the lower substrate 102. For example, the gate insulation layer 113 may include a silicon nitride and have a thickness of about 4,500 Å. A semiconductor layer is formed on the gate insulation layer 113. The semiconductor layer may include a first amorphous silicon ("a-Si") layer a second amorphous silicon ("n+ a-Si") layer doped with n+ ions at high concentration. The first and second amorphous layers may respectively have thicknesses of about 2,000 Å and about 500 Å. The semiconductor layer is etched to form the semiconductor pattern 114. The semiconductor pattern 114 is formed on the gate insulation layer 113 which is formed on the gate lines 111.

Figure 4C:
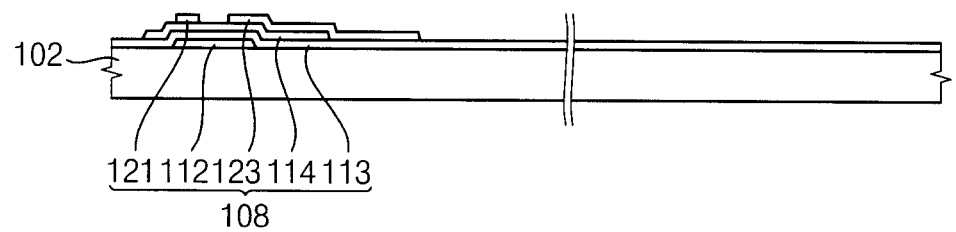

Then, as illustrated in FIG. 2 and FIG. 4C, a data metal layer is formed on the gate insulation layer 113 and on the semiconductor pattern 114. The data metal layer may have a three-layer structure in which a first molybdenum layer, an aluminum layer and a second molybdenum layer are sequentially stacked. The first molybdenum layer, the aluminum layer and the second molybdenum layer may respectively have thicknesses of about 300 Å, about 2,500 Å and about 1,000 Å. The data metal layer is patterned to form the data lines 115, a source electrode 121 and a drain electrode 123.

The data lines 115 are formed on the gate insulation layer 113 and extend in the y direction. The source electrode 121 may be formed adjacent to a position at which the gate line 111 crosses the data line 115. The source electrode 121 protrudes from the data line 115 to overlap with the semiconductor pattern 114.

The drain electrode 123 is formed on the semiconductor pattern 114 and faces the source electrode 121. The drain electrode 123 may extend so that a portion of the drain electrode 123 may be disposed in the pixel area PA.

In one exemplary embodiment of the present invention, the pixel area PA may have a substantially rectangular shape which has a length along the y direction. In another exemplary embodiment of the present invention, the pixel area PA may have a substantially 'Z' shape. The gate lines 111 may be disposed adjacent to the pixel area PA and extend in the x direction. The data lines 115 may be disposed adjacent to the pixel area PA and extend in the y direction.

When the semiconductor layer and the data metal layer are etched by a single etching process, the data line 115, the source electrode 121, and the drain electrode 123 may be formed on the semiconductor pattern 114 and the semiconductor pattern 114 may be formed on the gate insulation layer 113 which is formed on the gate electrode 112. A portion of the semiconductor pattern 114 between the source electrode 121 and the drain electrode 123 may be etched back to define a channel layer.

The gate electrode 112, the gate insulation layer 113, the semiconductor pattern 114, the source electrode 121, and the drain electrode 123 define a switching element 108.

Figure 4D:
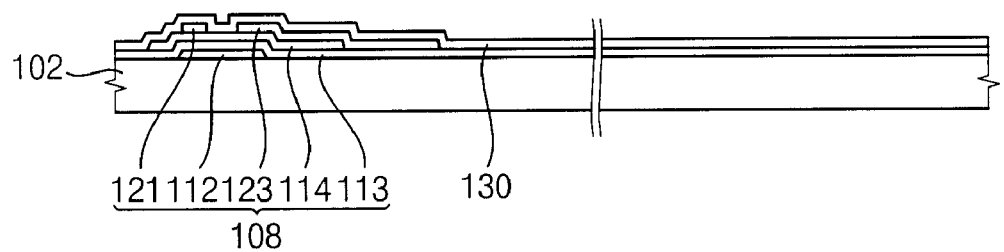

Then, as illustrated in FIG. 4D, a first passivation layer 130 is formed on the lower substrate 102 on which the data lines 115 are formed. The first passivation layer 130 may include silicon nitride. The first passivation layer 130 may have a thickness of about 2,000 Å. The first passivation layer 130 may have a contact hole to expose a portion of the drain electrode 123, as will be later shown as hole 143 in FIG. 4H.

Figure 4E:
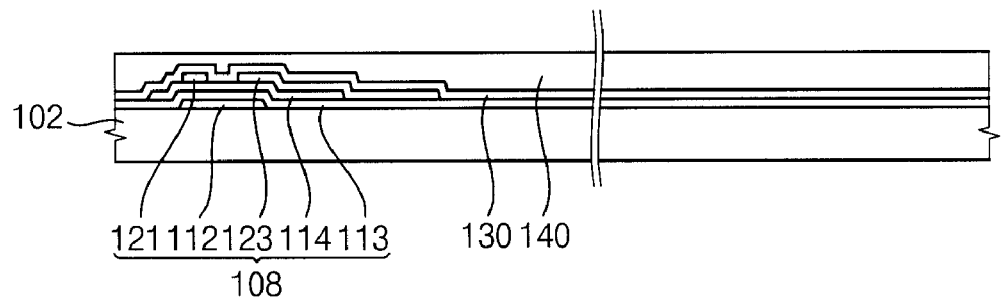

Then, as illustrated in FIG. 4E, an organic insulation layer 140 is formed on the first passivation layer 130. The organic insulation layer 140 may have a thickness of about 2 μm. The organic insulation layer 140 may reduce a parasitic capacitance between the pixel electrode 171 and the data line 115. When the pixel electrode 171 does not overlap with the data line 115, the organic insulation layer 140 may be omitted.

Figure 5:
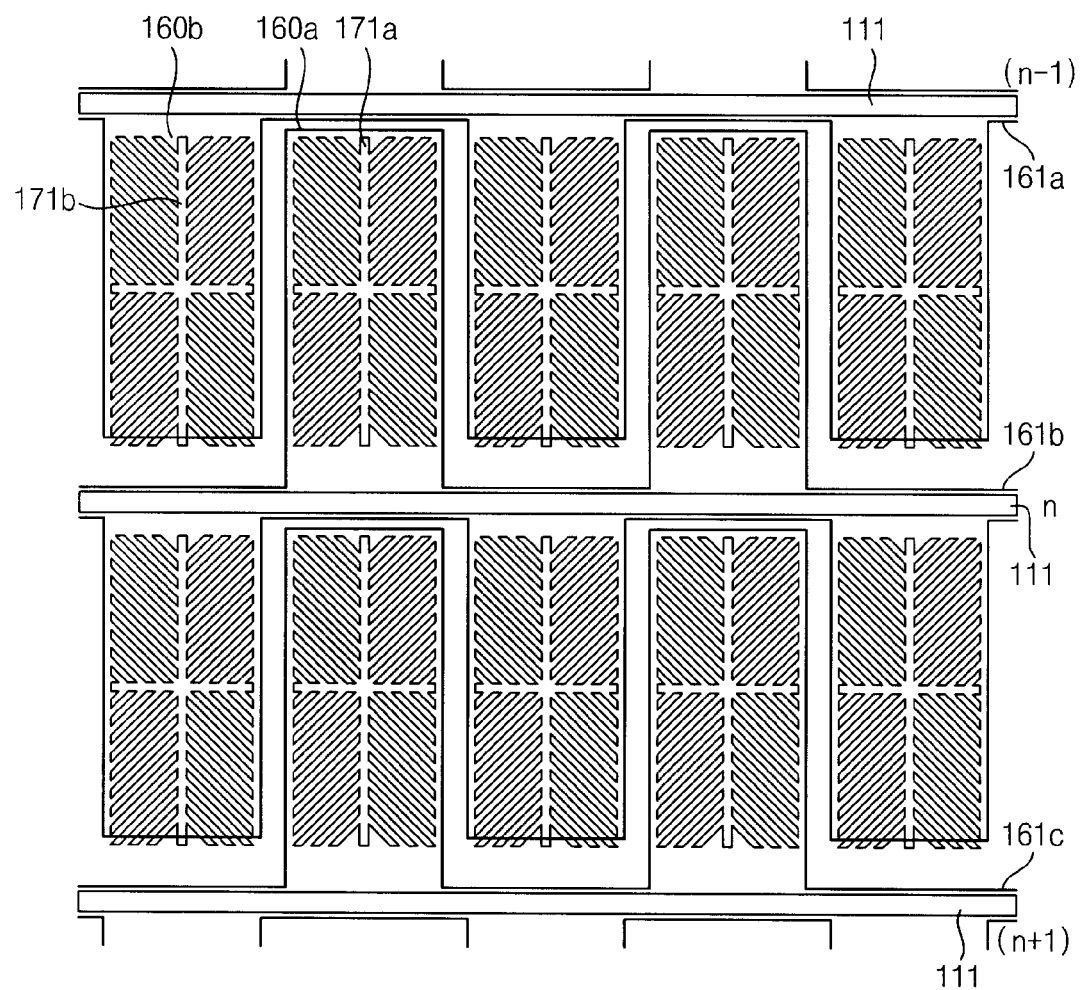
FIG. 5 is a plan view illustrating an exemplary supplementary electrode illustrated in FIG. 2.

FIG. 5 is a plan view illustrating an exemplary supplementary electrode illustrated in FIG. 2. For the sake of convenience, FIG. 5 does not show the gate line 111, the data line 115 and the switching element 108.

Figure 4F:
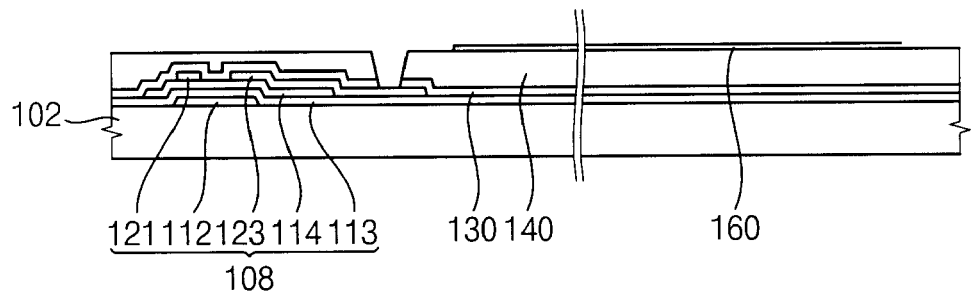

As illustrated in FIG. 2, FIG. 4F and FIG. 5, the supplementary electrode 160 is formed on the organic insulation layer 140. The supplementary electrode 160 and the pixel electrode 171 form a storage capacitor for maintaining a pixel voltage applied to the pixel electrode 171 during one frame.

A first transparent conductive material layer is formed on the organic insulation layer 140. The first transparent conductive material layer may include indium tin oxide ("ITO") or indium zinc oxide ("IZO") and have a thickness of about 900 Å. As illustrated in FIG. 4F and FIG. 5, the first transparent conductive material layer is patterned to form a supplementary electrode pattern which includes supplementary lines 161 as shown in FIG. 2, and as supplementary lines 161a, 161b and 161c in FIG. 5, and the supplementary electrode 160. The supplementary lines 161 may receive a supplementary voltage from line 37 shown in FIG. 1. The supplementary lines 161a, 161b and 161c may be parallel with the gate lines 111. A plurality of the supplementary electrodes 160 may protrude from each of the supplementary lines 161a, 161b and 161c. First and second supplementary electrodes 160a and 160b respectively protruding from adjacent ones of the supplementary lines 161a, 161b and 161c may be alternately disposed. In an exemplary embodiment as shown in FIG. 5, first supplementary electrode 160a may be overlapped by first pixel electrode 171a and second supplementary electrode 160b may be overlapped by second pixel electrode 171b.

The supplementary lines 161a, 161b and 161c may respectively overlap with the gate lines 111, and the supplementary electrodes 160 protrude from the supplementary lines 161a, 161b and 161c to be disposed in the pixel areas PA. The data line 115 may be disposed between adjacent supplementary electrodes 160. In exemplary embodiments of the present invention, the supplementary electrode 160 may partially overlap with the data line 115.

Since the supplementary electrode 160 may be formed of a transparent material, an aperture ratio of the pixel area PA may be increased, although the supplementary electrode 160 is formed in the pixel area PA.

Since the first and second supplementary electrodes 160 respectively protruding from adjacent ones of the supplementary lines 161a, 161b and 161c may be alternately disposed, the LCD apparatus 100 may be driven by a line-inversion method, a column-inversion method or a dot-inversion method.

For example, the supplementary electrodes 160 downwardly protruding from an n-th supplementary line 161b may be disposed in odd-numbered pixel areas PA of pixel areas PA between an n-th gate line and an (n+1)-th gate line, and the supplementary electrodes 160 upwardly protruding from an (n+1)-th supplementary line 161c may be disposed in even-numbered pixel areas PA of the pixel areas PA between the n-th gate line and the (n+1)-th gate line. In addition, the supplementary electrodes 160 downwardly protruding from an (n−1)-th supplementary line 161a may be disposed in odd-numbered pixel areas PA of pixel areas PA between an (n−1)-th gate line and the n-th gate line, and the supplementary electrodes 160 upwardly protruding from the n-th supplementary line 161b may be disposed in even-numbered pixel areas PA of the pixel areas PA between the (n−1)-th gate line and the n-th gate line.

Figure 4G:
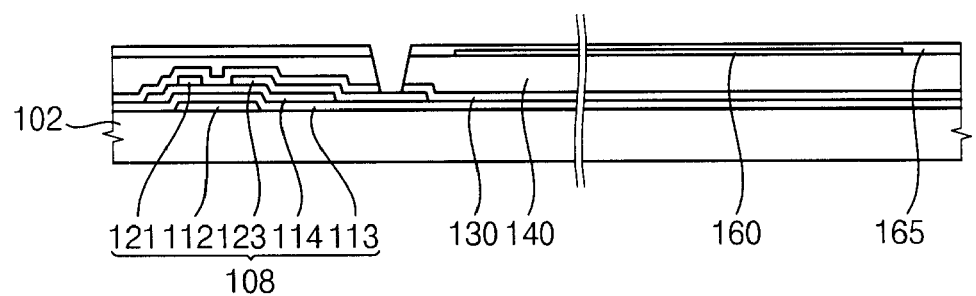

Then, as illustrated in FIG. 4G, a second passivation layer 165 may be formed on the supplementary electrode 160. The second passivation layer 165 may include silicon nitride. The second passivation layer 165 may include a contact hole which is connected to the contact hole of the organic insulation layer 140, which is collectively referred to as contact hole 143 in FIG. 4H.

Figure 4H:
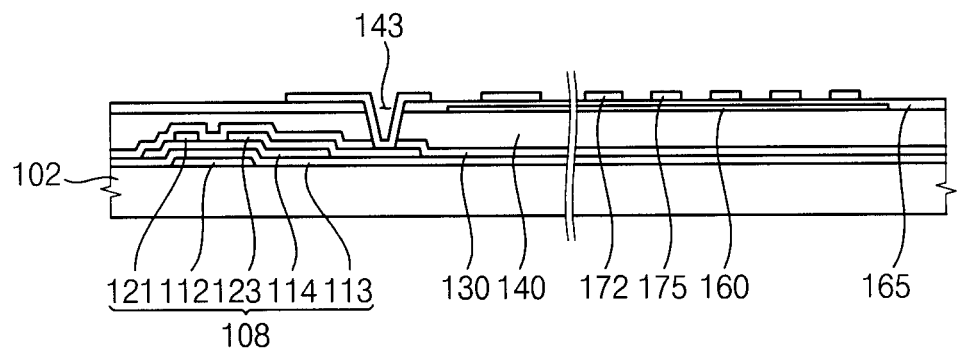

As illustrated in FIG. 4H, a second transparent conductive material layer is formed on the second passivation layer 165. The second transparent conductive material layer may include a transparent conductive material, such as ITO or IZO. The second transparent conductive material layer may have a thickness of about 900 Å. The second transparent conductive material layer is patterned to form the pixel electrode 171. The pixel electrode 171 is electrically connected to the drain electrode 123 through the contact hole 143 which includes contact holes of the organic insulation layer 140 and the second passivation layer 165.

The pixel electrode 171 may include a connection part 172 and a slit part 175.

In exemplary embodiments of the present invention, as illustrated in FIG. 2, the connection part 172 may include a first connection part and a second connection part. The first connection part may extend in the x direction and the second connection part may extend in the y direction. The first and second connection parts may form a substantially cross configuration. The connection part 172 may divide the pixel area PA into four domains.

The slit part 175 may include a plurality of silts extending from the connection part 172 to a side portion of the pixel area PA. For example, the slits may include first silts and second slits. The first silts may extend in a first direction which is inclined with respect to both the gate line 111 and the data line 115. The second slits may extend in a second direction which is substantially perpendicular to the first direction. For example, the first direction may be inclined with respect to the gate line 111 by about 45°. Each of the four domains of the pixel area PA may include the slits extending in the same direction. The slits disposed in adjacent domains of the pixel area PA may extend in different directions from each other.

For example, in FIGS. 2 and 5, two domains of the four domains, which are arranged in a diagonal direction of the pixel areas PA, may include the slits extending in the first direction and remaining two domains of the four domains may include the slits extending in the second direction.

Figure 4I:
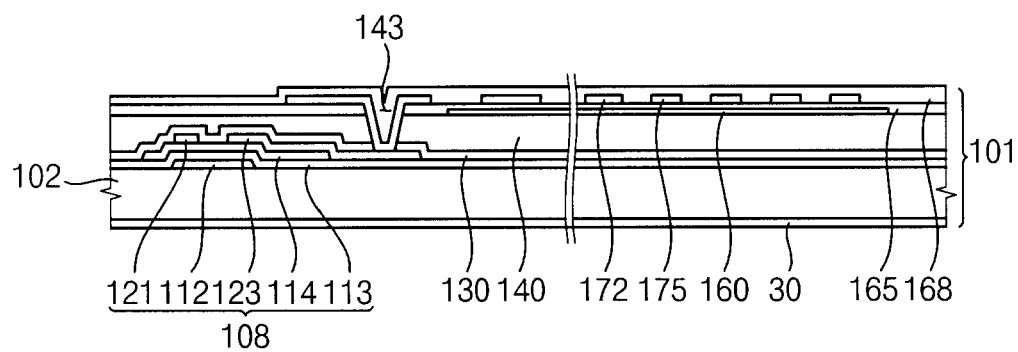

Then, as illustrated in FIG. 4I, a lower orientation layer 168 is formed on the pixel electrode 171 to cover the pixel electrode 171.

The lower orientation layer 168 may initially orientate liquid crystal molecules of the liquid crystal layer 107 in a direction which is substantially perpendicular to the array substrate 101 and the opposing substrate 105.

The array substrate 101 may further include a lower polarization plate 30. As illustrated in FIG. 4I, the lower polarization plate 30 may be disposed on a rear surface of the lower substrate 102.

The lower polarization plate 30 may have a polarization axis which is substantially parallel with the x direction. Then, an angle between the first direction in which the first slits extend and the polarization axis of the lower polarization plate 30 may be about 30° and an angle between the second direction in which the second slits extend and the polarization axis of the lower polarization plate 30 may be about 135°.

Referring again to FIGS. 1 and 3, the opposing substrate 105 may include an upper substrate 104, a light-blocking pattern 181, a color filter pattern 185, an overcoat layer 187, a common electrode 190, an upper orientation layer 60, and an upper polarization plate 70.

The light-blocking pattern 181 may be formed on a lower surface of the upper substrate 104 and correspond to the gate line 111, the data line 115 and the switching element 108. The color filter pattern 185 may be formed on the lower surface of the upper substrate 104 and correspond to the pixel area PA. The color filter pattern 185 may include a red color filter, a green color filter and a blue color filter. The red, green and blue color filters may be respectively disposed in the pixel areas PA along the x direction.

The overcoat layer 187 may be formed on the lower surface of the upper substrate 104 to cover the color filter pattern 185 and the light-blocking pattern 181. The common electrode 190 may be formed on the overcoat layer 187.

The upper orientation layer 60 may be formed on the common electrode 190 and vertically orientate the liquid crystal molecules of the liquid crystal layer 170.

The upper polarization plate 70 may be disposed on an upper surface of the upper substrate 104. The upper polarization plate 70 may have a polarization axis that is substantially perpendicular to the polarization axis of the lower polarization plate 30.

When a data signal from the driver 5 is applied to the data line 115 and a gate signal is applied to the gate line 111, the data signal is converted into a pixel voltage by the switching element 108 and the pixel voltage is applied to the pixel electrode 171.

In exemplary embodiments of the present invention, since the pixel electrode 171 includes a connection part 172 and the slit part 175 and the liquid crystal layer 107 includes the liquid crystal that is in vertical alignment, the liquid crystal of the liquid crystal layer 107 may be aligned in different directions according to the domains of the pixel areas PA.

A distance between adjacent slits in the slit part 175 may be smaller than or substantially equal to a thickness of the liquid crystal layer 107. The slits of the pixel electrode 171 may align the liquid crystal molecules in a direction that is substantially parallel with an extension direction of the slits of the pixel electrode 171.

In contrary to exemplary embodiments of the present invention, when the array substrate 101 does not include the supplementary electrode 160, an electric field may not be applied between the slits of the pixel electrode 171 or a weak electric field may be applied between the slits of the pixel electrode 171, because of an absence of an electrode opposing the common electrode 190 in a space between the slits of the pixel electrode 171. In addition, the weak electric field in a side portion of the pixel area PA may be interfered with by a signal transferred through the data line 115.

In exemplary embodiments of the present invention, the supplementary electrode 160 may have a portion corresponding to the pixel electrode 171 and a portion corresponding to the space between the slits of the pixel electrode 171. In addition, the supplementary electrode 160 may receive a supplementary voltage. The supplementary voltage may have a phase that is substantially the same as the phase of the pixel voltage or an inverted phase of the pixel voltage according to driving methods.

Accordingly, in the space between the slits of the pixel electrode 171, an electric field may be generated between the supplementary electrode 160 and the common electrode 190 and the liquid crystal between the slits of the pixel electrode 171 may be controlled based on a predetermined mode. According to exemplary embodiments of the present invention, the aperture ratio of the pixel area PA may be increased and the response time of the liquid crystal layer 107 may be improved.

The supplementary electrode 160 may prevent a parasitic capacitance between the pixel electrode 171 and the data line 115 to prevent the data signal from being distorted.

Figure 6A:
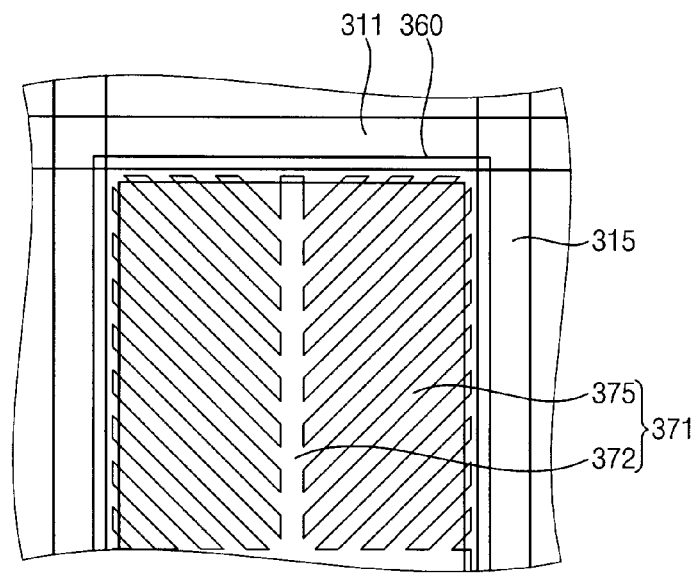
FIGS. 6A and 6B are plan views illustrating variant examples of the supplementary electrode illustrated in FIGS. 2 and 5.
Figure 6B:
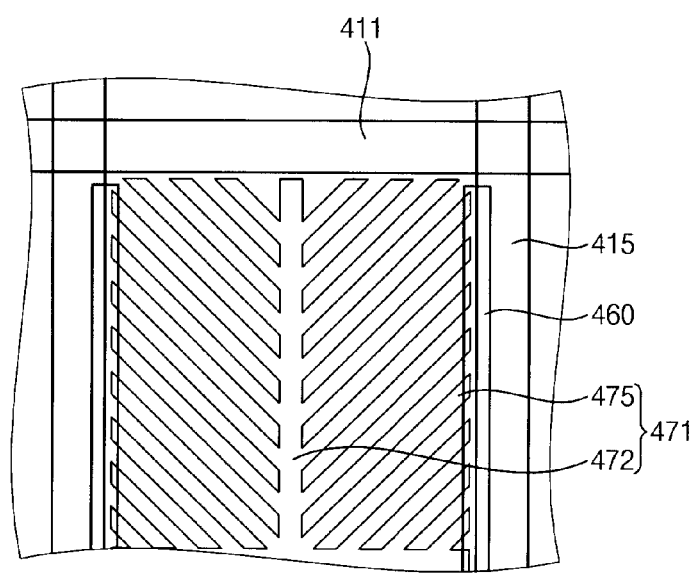

FIGS. 6A and 6B are plan views illustrating variant examples of the supplementary electrode illustrated in FIGS. 2 and 5.

Referring to FIGS. 6A and 6B, gate lines 311, 411, data lines 315, 415, and pixel electrodes 371, 471 having connection parts 372, 472, and slits 375, 475 are formed substantially the same as in the previous exemplary embodiments. The supplementary electrodes 360 and 460 may extend along a side portion of the pixel area PA so that the supplementary electrodes 360 and 460 may overlap only with end portions of the slits 375 and 475 in the pixel electrodes 371 and 471, respectively. In an exemplary embodiment of the present invention, as illustrated in FIG. 6A, the supplementary electrode 360 may extend along an entire side portion of the pixel area PA. In another exemplary embodiment of the present invention, as illustrated in FIG. 6B, the supplementary electrode 460 may extend along a portion of the entire side portion of the pixel area PA. For example, the supplementary electrode 460 may extend only along sides of the pixel areas PA, which are parallel to the y direction.

In the array substrates 301 and 401 which respectively have the supplementary electrodes 360 and 460 illustrated in FIGS. 6A and 6B, since the supplementary electrodes 360 and 460 extend only along the side portion of the pixel area PA, the array substrates 301 and 401 may have light transmissivity greater than that of an array substrate having a supplementary electrode which entirely overlaps with the pixel area PA.

Figure 7:
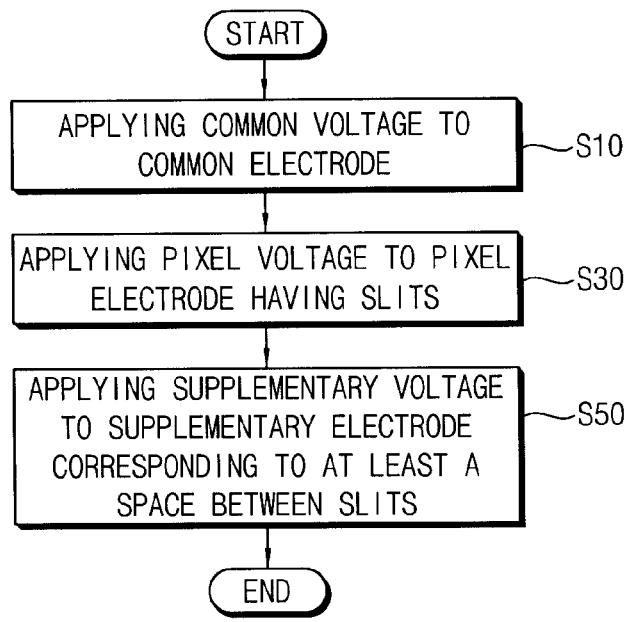
FIG. 7 is a flowchart illustrating an exemplary method of driving the exemplary LCD apparatus illustrated in FIGS. 1 to 5.
Figure 8:
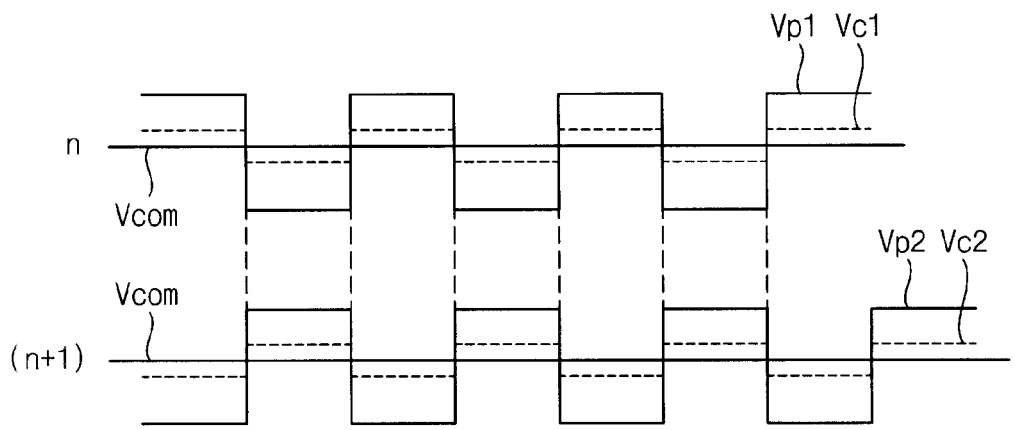
FIG. 8 is a graph illustrating waveforms of a pixel voltage and a supplementary voltage according to the exemplary method illustrated in FIG. 7.

FIG. 7 is a flowchart illustrating an exemplary method of driving the exemplary LCD apparatus illustrated in FIGS. 1 to 5. FIG. 8 is a graph illustrating waveforms of a pixel voltage and a supplementary voltage according to the exemplary method illustrated in FIG. 7.

Referring to FIGS. 7 and 8, in the exemplary method of driving the LCD apparatus, a common voltage Vcom is applied to a common electrode 190 (step S10). As illustrated above, the driver 5 may apply the common voltage Vcom to the common electrode 190 via a common line electrically connected to the common electrode 190.

A pixel voltage Vp is applied to a pixel electrode 171 which has a slit part 175 controlling a movement direction of liquid crystal molecules (step S30).

Hereinafter, a pixel electrode in an n-th row and an m-th column is referred to as a first pixel electrode 171*a*. As illustrated in FIG. 8, a first pixel voltage Vp1 applied to the first pixel electrode 171*a* may be a data signal which is a substantially pulse wave swinging between +Va and −Va with respect to the common voltage Vcom. The first pixel voltage Vp1 initially applied to the first pixel electrode 171*a* may be +Va.

Hereinafter, one of pixel electrodes in an (n+1)-th row that is adjacent to the n-th row is referred to as a second pixel electrode 171*b*. In an exemplary embodiment of the present invention, the second pixel electrode 171*b* may be a pixel electrode in the m-th column. In another exemplary embodiment of the present invention, the second pixel electrode 171*b* may be a pixel electrode in an (m+1)-th column which is adjacent to the m-th column.

As illustrated in FIG. 8, a second pixel voltage Vp2 applied to the second pixel electrode 171*b* may be a data signal which is a substantially pulse wave swinging between −Vb and +Vb with respect to the common voltage Vcom. The second pixel voltage Vp1 initially applied to the second pixel electrode 171*b* may be −Vb. For example, Va and Vb may be substantially the same as about 7.5 V.

The first pixel voltage Vp1 and the second pixel voltage Vp2 are respectively applied to the first pixel electrode 171*a* and the second pixel electrode 171*b* according to control of a gate signal GS. The first pixel voltage Vp1 may have a phase that is substantially the same as an inverted phase of the second pixel voltage Vp2. As illustrated above, the first pixel electrode 171*a* is disposed in the n-th row and the m-th column and the second pixel electrode 171*b* is disposed in the (n+1)-th row and the m-th column or the (m+1)-th column. Therefore, the method of driving the LCD apparatus may include a dot-inversion driving method, a column-inversion driving method and a line-inversion driving method.

Then, a supplementary voltage Vc is applied to the supplementary electrode 160 (step S50).

For example, a first supplementary voltage Vc1 may be applied to a first supplementary electrode 160*a* under the first pixel electrode 171*a*. An electric field between the first supplementary electrode 160*a* and the common electrode 190 may compensate a weak electric field applied to the space between the slits of the first pixel electrode 171*a*. As illustrated in FIG. 8, the first supplementary voltage Vc1 and the first pixel voltage Vp1 may be simultaneously applied to the first supplementary electrode 160*a* and the first pixel electrode 171*a*, respectively. The first supplementary voltage Vc1 may have a phase that is substantially the same as that of the first pixel voltage Vp1.

In addition, a second supplementary voltage Vc2 may be applied to a second supplementary electrode 160*b* under the second pixel electrode 171*b*. An electric field between the second supplementary electrode 160*b* and the common electrode 190 may compensate a weak electric field applied to the space between the slits of the second pixel electrode 171*b*. As illustrated in FIG. 8, the second supplementary voltage Vc2 and the second pixel voltage Vp2 may be simultaneously applied to the second supplementary electrode 160b and the second pixel electrode 171b, respectively. The second supplementary voltage Vc2 may have a phase that is substantially the same as that of the second pixel voltage Vp2.

Accordingly, the first and second pixel voltages Vp1 and Vp2 respectively applied to the first and second pixel electrodes 171a and 171b may have voltage levels that are larger than that of the data signals outputted from the drain electrodes 123 of the switching elements 108. As a result, the brightness of the LCD apparatus maybe increased.

Figure 9:
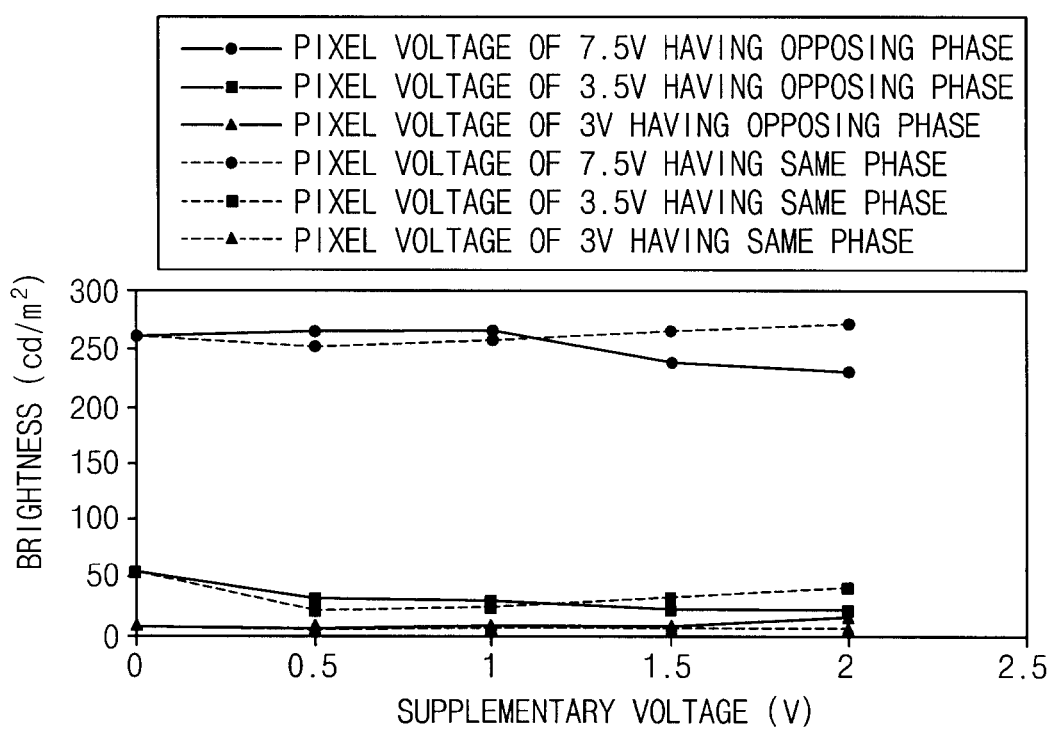
FIG. 9 is a graph illustrating the brightness of the exemplary LCD apparatus based on the supplementary voltage.

FIG. 9 is a graph illustrating the brightness of the LCD apparatus based on the supplementary voltage.

In FIG. 9, a horizontal axis indicates the supplementary voltage applied to the supplementary electrode 160 and a vertical axis indicates the brightness in the display area DA of the LCD apparatus 100.

Referring to FIG. 9, when the pixel voltage is 3 V or 3.5 V, the brightness is in a range of about 20 $cd/m^2$ to about 50 $cd/m^2$, although the supplementary voltage is increased to be in a range of 0.5 V to 2 V. When the pixel voltage is 7.5 V, the brightness is in a range of about 240 $cd/m^2$ to about 270 $cd/m^2$. When the pixel voltage is large, the brightness may be considerably increased independent of a relation between the phase of the supplementary voltage and the phase of the pixel voltage.

That is, when the pixel voltage is larger than a predetermined voltage level, the electric field between the supplementary electrode 160 and the common electrode 190 may effectively compensate the weak electric field applied to the space between the slits of the pixel electrode 171 so that the light transmissivity of the liquid crystal in the space between the slits of the pixel electrode 171 may be considerably increased. Therefore, the light transmissivity of the LCD apparatus 100 may be increased.

For example, in the pixel area PA illustrated in FIG. 5, the pixel voltages Vp1 and Vp2 applied to the first and second pixel electrodes 171a and 171b overlapping with the first and second supplementary electrodes 160a and 160b may be increased by the supplementary voltages Vc1 and Vc2 applied to the first and second supplementary electrodes 160a and 160b. In the space between the slits of the first and second pixel electrodes 171a and 171b, the supplementary voltages Vc1 and Vc2 applied to the first and second supplementary electrodes 160a and 160b may effectively arrange the liquid crystal molecules. Therefore, the brightness of the LCD apparatus may be increased.

According to the exemplary method of driving the exemplary LCD apparatus, the exemplary array substrate for performing the method and the exemplary LCD apparatus having the array substrate, since the pixel electrode 171 having the connection part 172 and the slit part 175 may divide the pixel area PA into multi-domains, the viewing angle of the LCD apparatus 100 may be improved. Also, since the supplementary electrode 160 may compensate the weak electric field applied to the space between the slits of the pixel electrode 171, the light transmissivity of the side portion of the pixel area PA may be increased. In addition, since the supplementary voltage Vc applied to the supplementary electrode 160 increase the pixel voltage Vp applied to the pixel electrode 171, the brightness of the LCD apparatus 100 maybe further increased.

Embodiment 2

Figure 10:
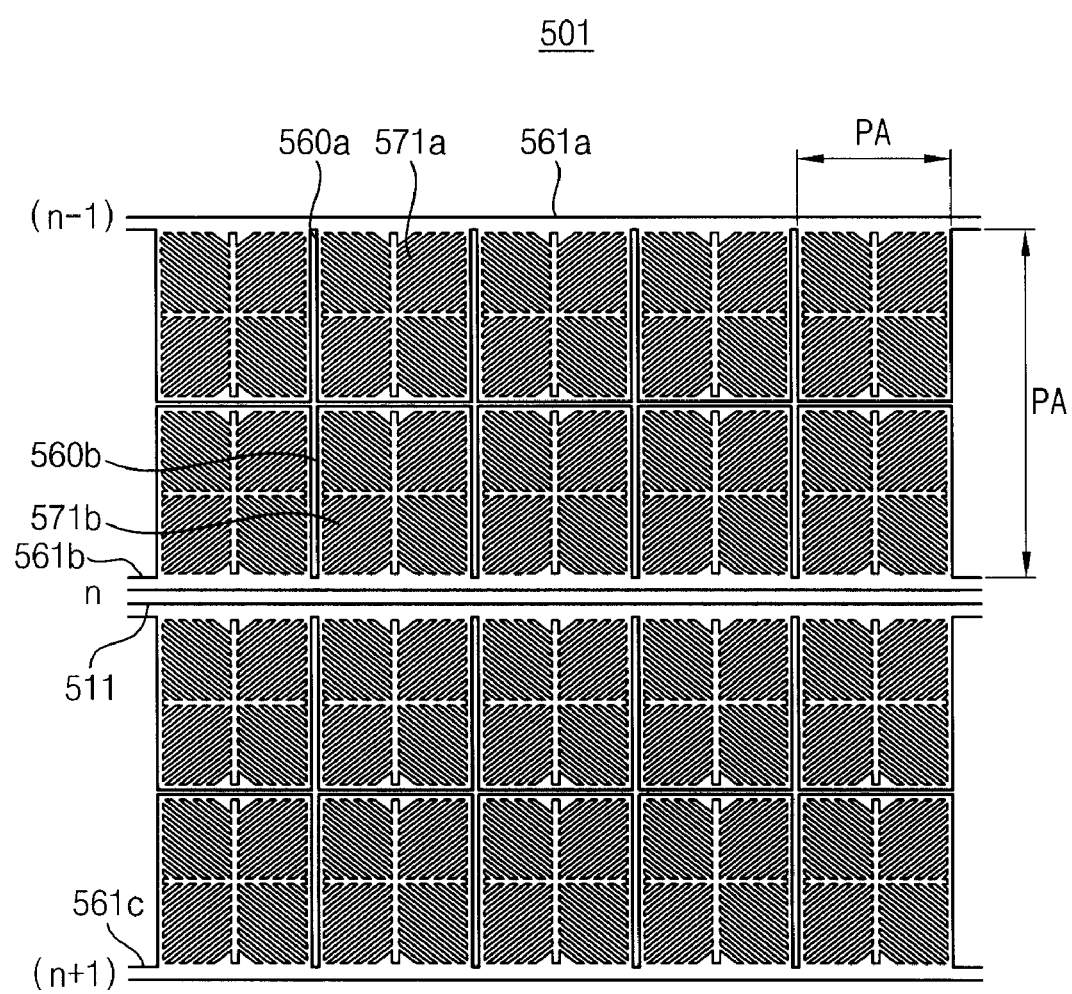
FIG. 10 is a plan view illustrating an exemplary array substrate employed in an exemplary LCD apparatus in accordance with Embodiment 2 of the present invention.

FIG. 10 is a plan view illustrating an exemplary array substrate employed in an exemplary LCD apparatus in accordance with Embodiment 2 of the present invention. For the sake of convenience, FIG. 10 shows the gate line 511, but does not show the data line and the switching element. An array substrate 501 and an LCD apparatus having the array substrate 501 has components that are substantially the same as those of the arrays substrate 101 illustrated in FIGS. 1 to 5, except that a first pixel electrode 571a and a second pixel electrode 571b are disposed in a single pixel area PA and a first supplementary electrode 560a and a second supplementary electrode 560b are disposed under the first and second pixel electrodes 571a and 571b.

Referring to FIG. 10, the first and second pixel electrodes 571a and 571b are arranged in the single pixel area PA along the y direction. The first and second pixel electrodes 571a and 571b may be adjacent to each other. Each of the first and second pixel electrodes 571a and 571b may have a connection part and the slit part. The first and second pixel electrodes 571a and 571b may be sub-pixel electrodes for forming a single pixel. The first and second pixel electrodes 571a and 571b may correspond to one of the red color filter, the green color filter and the blue color filter formed on the opposing substrate.

In an exemplary embodiment of the present invention, the first and second pixel electrodes 571a and 571b may be respectively connected to separate switching elements to independently receive pixel voltages from the two switching elements. In another exemplary embodiment of the present invention, the first and second pixel electrodes 571a and 571b may receive the same pixel voltage from a single data line.

The first and second supplementary electrodes 560a and 560b may be connected to separate supplementary lines 561a, 561b and 561c. The first and second supplementary electrodes 560a and 560b may be disposed corresponding to at least a space between end portions of the slits of the first and second pixel electrodes 571a and 571b to compensate electric fields generated by the first and second pixel electrodes 571a and 571b.

An exemplary method of manufacturing an exemplary array substrate described hereinafter is substantially the same as the exemplary method of manufacturing the exemplary array substrate illustrated in FIGS. 4A to 4I, except for the disposition of the pixel electrode. Thus, any repetitive explanation will be omitted.

As described above, the pixel electrode may be formed by processes that are substantially the same as those of forming the pixel electrode illustrated in Embodiment 1, except that the pixel electrode includes the first and second pixel electrodes 571a and 571b.

Figure 11:
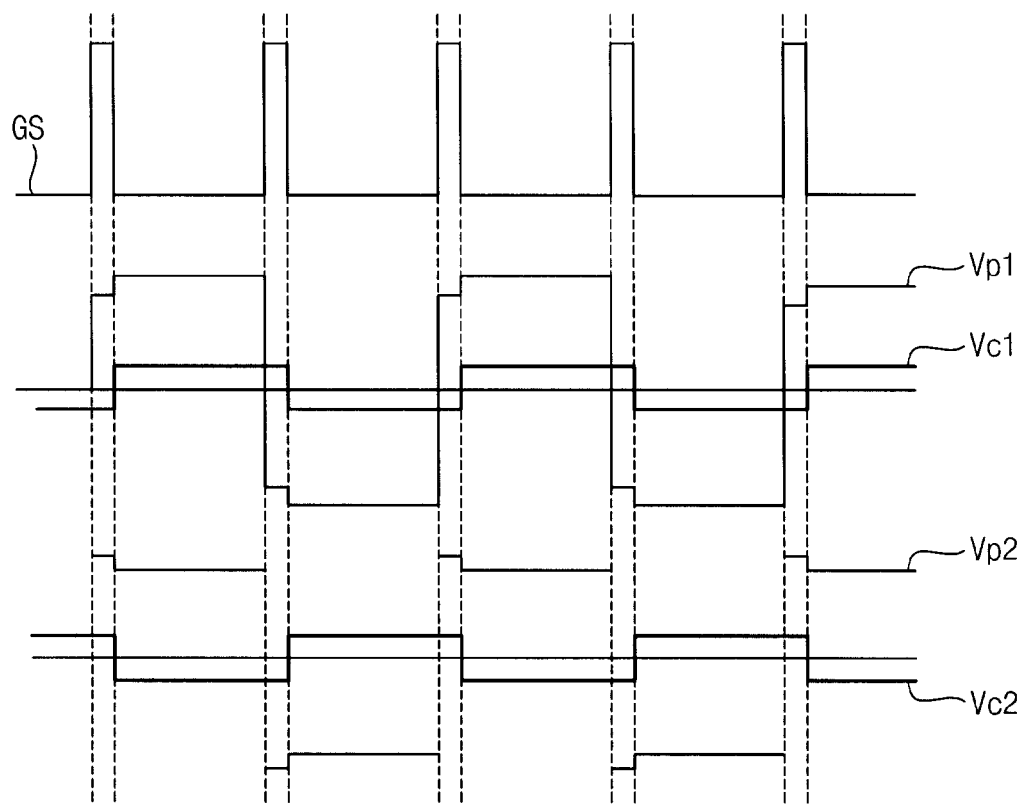
FIG. 11 is a graph illustrating waveforms of a pixel voltage and a supplementary voltage in accordance with an exemplary method of driving the exemplary LCD apparatus having the exemplary array substrate illustrated in FIG. 10.

FIG. 11 is a graph illustrating waveforms of a pixel voltage and a supplementary voltage in accordance with an exemplary method of driving the exemplary LCD apparatus having the exemplary array substrate illustrated in FIG. 10.

Referring to FIGS. 10 and 11, an exemplary method of driving an exemplary LCD apparatus in accordance with Embodiment 2 of the present invention may be substantially the same as the exemplary method illustrated in FIGS. 7 and 8, except for a method of applying the supplementary voltage to the supplementary electrode. Thus, any repetitive explanation will be omitted.

In Embodiment 2, the first and second pixel voltages Vp1 and Vp2 which have the same phase are respectively applied to the first pixel electrode 571a and the second pixel electrode 571b.

In Embodiment 2, the first supplementary voltage Vc1 and the second supplementary voltage Vc2 that has an inverted phase with respect to the phase of the first supplementary voltage Vc1 may be respectively applied to the first and second supplementary electrodes 560a and 560b. Therefore, in a single pixel area PA, different electric fields may be applied to the liquid crystal, so that the viewing angle of the LCD apparatus in accordance with Embodiment 2 of the present invention may be larger than that of the LCD apparatus in accordance with Embodiment 1 of the present invention.

For example, as illustrated in FIG. 11, the first supplementary voltage Vc1 applied to the first supplementary electrode 560a may have a phase that is substantially the same as that of the first pixel voltage Vp1 and the second supplementary voltage Vc2 applied to the second supplementary electrode 560b may have an inverted phase with respect to the second pixel voltage Vp2.

The first supplementary voltage Vc1 having the phase that is substantially the same as that of the first pixel voltage Vp1 raises the first pixel voltage Vp1. For example, the first supplementary voltage of about 2 V may raise the first pixel voltage from about 7.5 V to about 8 V.

The second supplementary voltage Vc2 having the inverted phase with respect to the second pixel voltage Vp2 lowers the second pixel voltage Vp2. For example, the second supplementary voltage of about −2 V may lower the second pixel voltage from about 7.5 V to about 6 V.

When the first and second pixel voltages Vp1 and Vp2 have the same phase and the first supplementary voltage Vc1 and the second supplementary voltage Vc2 have opposite phases to each other, the brightness may be increased at a position corresponding to the first pixel electrode 571a because the first pixel voltage Vp1 is raised, and the brightness may be decreased at a position corresponding to the second pixel electrode 571b because the second pixel voltage Vp2 is lowered.

Accordingly, different pixel voltages are applied to the pixel electrodes in a single pixel area PA, so that the viewing angle may be increased. Also, the supplementary electrode effectively controls the arrangement of the liquid crystal corresponding to the space between the end portions of the slits of the pixel electrode, so that the aperture ratio of the pixel areas PA may be increased. As a result, the display quality of the LCD apparatus may be improved.

Embodiment 3

Figure 12:
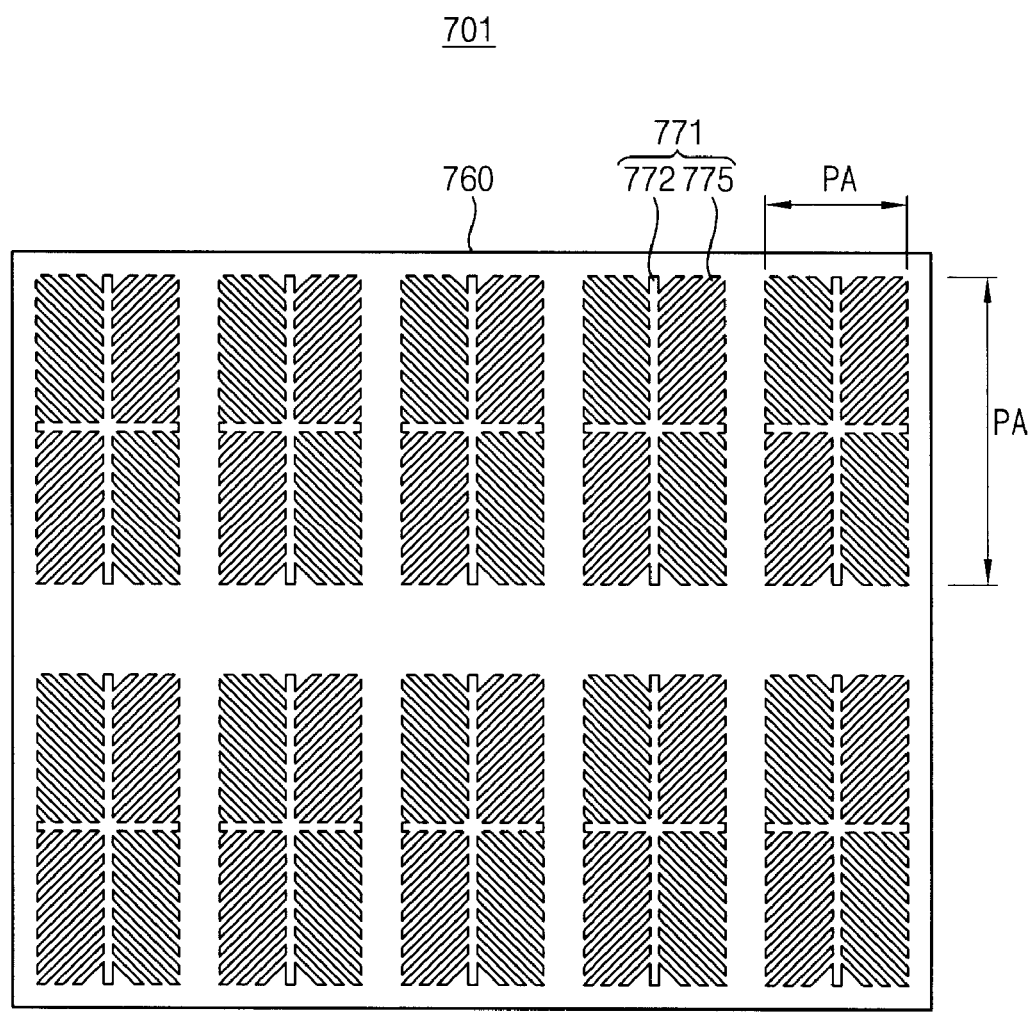
FIG. 12 is a plan view illustrating an exemplary array substrate employed in an exemplary LCD apparatus in accordance with Embodiment 3 of the present invention.

FIG. 12 is a plan view illustrating an exemplary array substrate employed in an exemplary LCD apparatus in accordance with Embodiment 3 of the present invention. For the sake of convenience, FIG. 12 does not show the gate line, the data line and the switching element.

Referring to FIG. 12, an array substrate 701 in accordance with Embodiment 3 of the present invention may have components that are substantially the same as those of the array substrate 101 illustrated in FIGS. 1 to 5, except for the shape of a supplementary electrode 760. Thus, the same or similar components are referred to using the same reference numerals and any repetitive explanation is omitted.

In Embodiment 3 of the present invention, although FIG. 12 shows the supplementary electrode 760 formed on the entire surface of the array substrate 701, a portion of the supplementary electrode 760 formed on the switching element may be reduced. Thus, the supplementary electrode 760 may be nearly completely disposed under the pixel electrode 771, which includes the connection part 772 and the slit part 775, such that the pixel electrode 771 overlaps the supplementary electrode 760 in all of each pixel area PA.

An exemplary method of manufacturing the exemplary array substrate in accordance with Embodiment 3 of the present invention may be substantially the same as the exemplary method illustrated in FIGS. 4A to 4I, except that the supplementary electrode is formed on substantially the entire surface of the first passivation layer.

In Embodiment 3 of the present invention, a transparent conductive material layer is formed on the first passivation layer. The transparent conductive material layer may include ITO or IZO. Portions of the transparent conductive material layer corresponding to the switching element, the data line and the gate line may be removed by an etching method to form the supplementary electrode 760. The supplementary electrode 760 may correspond to all pixel areas PA.

In an exemplary method of driving the exemplary LCD apparatus in accordance with Embodiment 3 of the present invention, the pixel electrodes 771 may be driven by the line-inversion method and the supplementary electrode 760 may receive the supplementary voltage of which the phase is inverted according to the rows to correspond to the pixel voltage. Except for the above-mentioned technical features, the method in accordance with Embodiment 3 of the present invention may be substantially the same as the method of driving the LCD apparatus illustrated in FIGS. 7 and 8. Thus, any repetitive explanation will be omitted.

Embodiment 4

Figure 13:
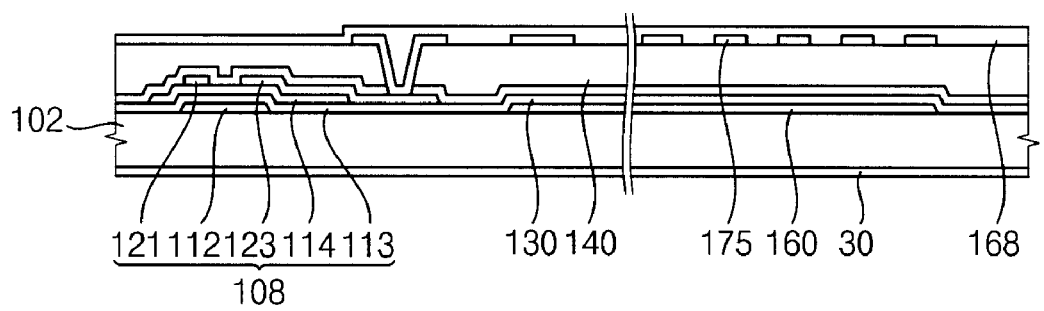
FIG. 13 is a cross-sectional view illustrating an exemplary array substrate employed in an exemplary LCD apparatus in accordance with Embodiment 4 of the present invention.

FIG. 13 is a cross-sectional view illustrating an exemplary array substrate employed in an exemplary LCD apparatus in accordance with Embodiment 4 of the present invention.

Referring to FIG. 13, an array substrate 901 in accordance with Embodiment 4 of the present invention may have components that are substantially the same as those of the array substrate illustrated in FIGS. 1 to 5, except that the supplementary electrode 160 and the gate line 111 are formed from the same layer, the second passivation layer is not formed, and the pixel electrode 175 is formed directly on the organic insulation layer 140. Thus, the same or similar components are referred to using the same reference numerals and any repetitive explanation is omitted.

An exemplary method of manufacturing the exemplary array substrate in accordance with Embodiment 4 of the present invention may be substantially the same as the method of manufacturing the array substrate illustrated in FIGS. 4A to 4H, except that the supplementary electrode 160 and the gate line 111 are formed from the same layer on the lower substrate 102.

The supplementary electrode 160 may include a transparent conductive material and may be simultaneously and integrally formed with the gate line in the pixel area PA of the lower substrate 102.

According to the exemplary method of manufacturing the array substrate in accordance with Embodiment 4 of the present invention, since the second passivation layer is not formed, processes for manufacturing the array substrate may be simplified and productivity may be improved.

An exemplary method of driving an LCD apparatus according to Embodiment 4 may be substantially the same as the exemplary method of driving the LCD apparatus illustrated in FIGS. 7 to 9. Thus, any repetitive explanation will be omitted.

Embodiment 5

Figure 14:
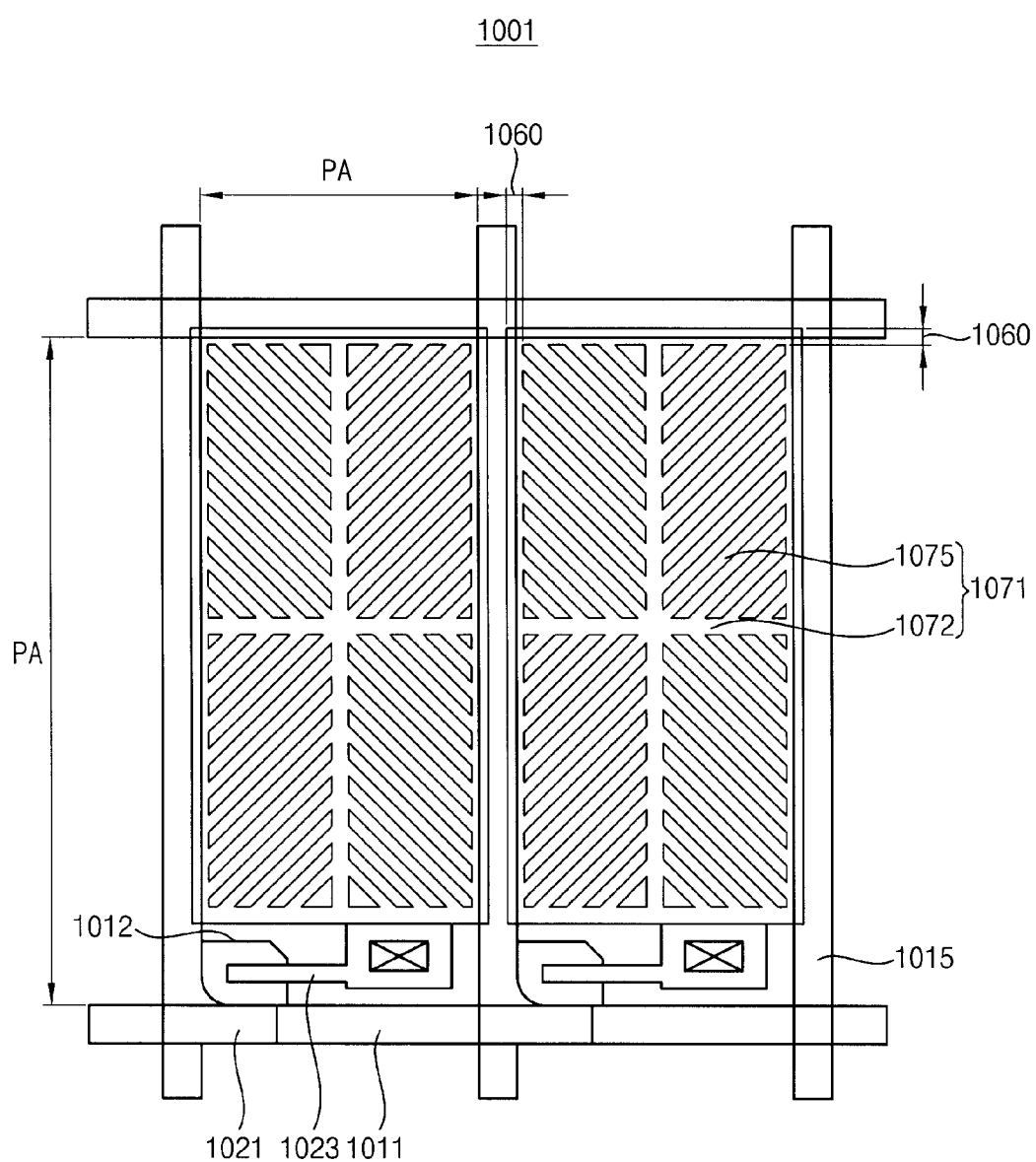
FIG. 14 is a plan view illustrating an exemplary array substrate employed in an exemplary LCD apparatus in accordance with Embodiment 5 of the present invention.

FIG. 14 is a plan view illustrating an array substrate employed in an LCD apparatus in accordance with Embodiment 5 of the present invention.

Referring to FIG. 14, an array substrate 1001 and an LCD apparatus may have components that are substantially the same as those of the array substrate and the LCD apparatus illustrated in FIGS. 1 to 5, except that the supplementary electrode 1060 is integrally formed with the pixel electrode 1071 and the second passivation layer is not formed. Thus, the same or similar components are referred to using substantially the same reference numerals and any repetitive explanation is omitted. For example, the pixel electrode 1071 includes the connection part 1072 and slits 1075, a gate line 1011 extends adjacent to the pixel area PA, and a switching element includes a gate electrode 1012, a source electrode 1021, and a drain electrode 1023.

In the array substrate and the LCD apparatus in accordance with Embodiment 5 of the present invention, the supplementary electrode 1060 may be integrally formed with the pixel electrode 1071 and electrically connect end portions of the slits 1075 of the pixel electrode 1071 with one another.

The supplementary electrode 1060 may extend along side portions of the pixel area PA. For example, the supplementary electrode 1060 may extend along the data line 1015 and the gate line 1011. The supplementary electrode 1060 may partially overlap with the data line 1015 and the gate line 1011.

The end portions of the slits 1075 may be connected to one another by the supplementary electrode 1060. As a result, the supplementary electrode 1060 may compensate the weak electric field applied to the space between the slits 1075 of the pixel electrode 1071. Therefore, the supplementary electrode 1060 may prevent the light transmissivity of a portion of the liquid crystal layer corresponding to the space between the slits 1075 from being reduced.

An exemplary method of manufacturing an array substrate in accordance with Embodiment 5 of the present invention may be substantially the same as the exemplary method of manufacturing the array substrate illustrated in FIGS. 4A to 4H, except that the supplementary electrode 1060 and the pixel electrode 1071 are integrally formed with each other on the organic insulation layer and the second passivation layer is not formed. Thus, any repetitive explanation will be omitted.

In the exemplary method of manufacturing the array substrate in accordance with Embodiment 5 of the present invention, the supplementary electrode 1060 is integrally formed with the pixel electrode 1071. The supplementary electrode 1060 may surround the pixel electrode 1071 to electrically connect end portions of the slits 1075 with one another. Alternatively, the supplementary electrode 1060 may surround a portion of the pixel electrode 1071 to electrically connect some of all end portions of the slits 1075 with one another.

In an exemplary method of driving an LCD apparatus in accordance with Embodiment 5 of the present invention, the pixel electrode 1071 is electrically connected to the supplementary electrode 1060.

Accordingly, the pixel voltage applied to the pixel electrode 1071 is applied to the supplementary electrode 1060 and the liquid crystal adjacent to the sides of the pixel area PA may be controlled by the supplementary electrode 1060 so that the transmissivity of the pixel area PA may be improved.

Figure 15:
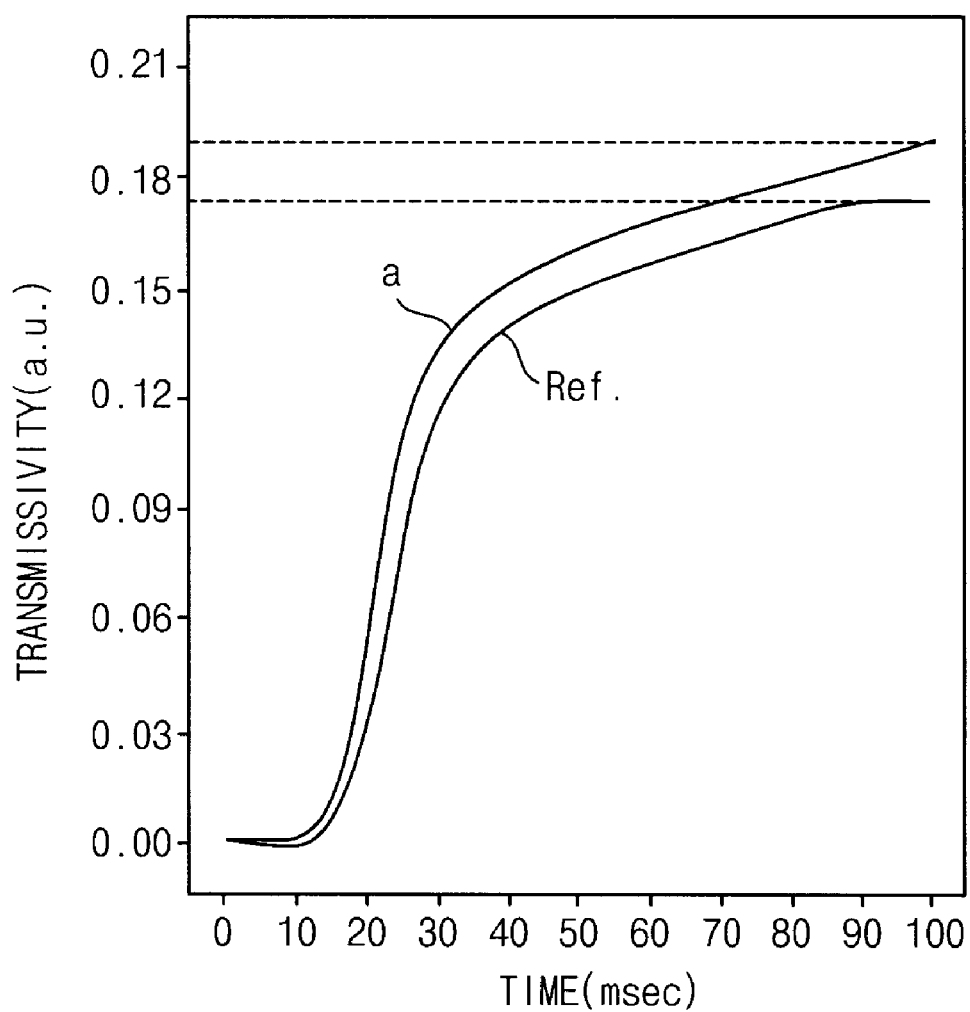
FIG. 15 is a graph illustrating the transmissivity of a liquid crystal layer when an exemplary supplementary electrode is integrally formed with a pixel electrode.

FIG. 15 is a graph illustrating the transmissivity of a liquid crystal layer when an exemplary supplementary electrode is integrally formed with a pixel electrode.

In FIG. 15, a curve 'REF' indicates a change of the light transmissivity of the LCD apparatus, which does not have the supplementary electrode 1060 illustrated above so that the end portions of the slits 1075 are spaced apart from one another, according to a time after the pixel electrode 1071 receives the pixel voltage.

Also, in FIG. 15, a curve 'a' indicates the change of the light transmissivity of the LCD apparatus, which have the supplementary electrode 1060 electrically connecting the end portions of the slits 1075, according to a time after the pixel electrode 1071 receives the pixel voltage.

Referring to FIG. 15, the curve 'a' has a maximum value of the light transmissivity that is larger than that of the curve 'REF' and reaches a predetermined value of the transmissivity faster than the curve 'REF'. That is, the LCD apparatus having the supplementary electrode has a response time and light transmissivity that are larger than those of the LCD apparatus not having the supplementary electrode. In the LCD apparatus in accordance with exemplary embodiments of the present invention, the supplementary electrode 1060 electrically connects the end portions of the slits 1075 of the pixel electrode 1071 to control the liquid crystal in the space between the slits 1075 of the pixel electrode 1071. Therefore, the light transmissivity and the response time of the LCD apparatus in accordance with exemplary embodiments of the present invention may be improved.

Figure 16A:
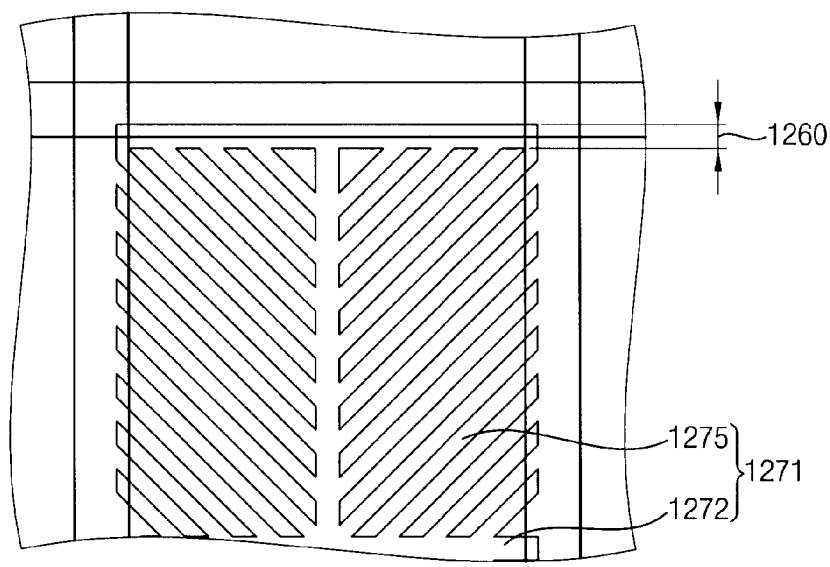
FIGS. 16A and 16B are plan views illustrating variant examples of a pixel electrode illustrated in FIG. 14.
Figure 16B:
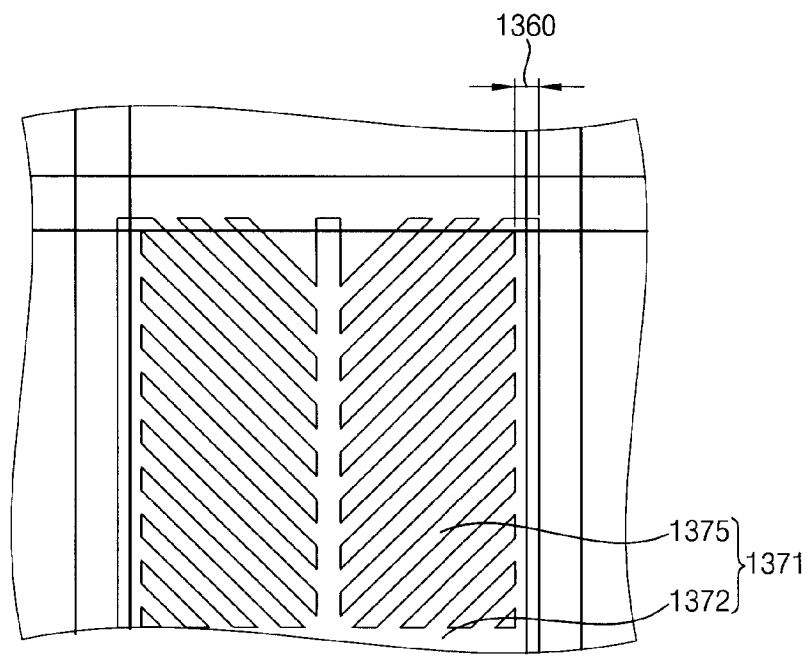

FIGS. 16A and 16B are plan views illustrating variant examples of a pixel electrode illustrated in FIG. 14.

Referring to FIGS. 16A and 16B, the supplementary electrodes 1260 and 1360 in array substrates 1201 and 1301 may electrically connect some or all of the end portions of the slits 1275 and 1375 in the pixel electrodes 1271 and 1371, which also have connection parts 1272 and 1372, respectively. For example, as illustrated in FIG. 6A, the supplementary electrode 1260 may extend along vertical sides of the pixel area PA to electrically connect the end portions of the slits 1275 arranged along the vertical sides of the pixel area PA. Alternatively, as illustrated in FIG. 6B, the supplementary electrode 1360 may extend along horizontal sides of the pixel area PA to electrically connect the end portions of the slits 1375 arranged along the horizontal sides of the pixel areas PA.

According to the variant example of the pixel electrode illustrated in FIGS. 16A and 16B, an area in which the supplementary electrode overlaps with the data line 1015 or the gate line 1011 may be reduced. Therefore, the array substrate having the pixel electrode illustrated in FIGS. 16A and 16B may have a parasitic capacitance that is smaller than that of the array substrate illustrated in FIG. 14.

According to the exemplary method of driving the exemplary LCD apparatus, the exemplary array substrate, the exemplary method of manufacturing the exemplary array substrate, and the exemplary LCD apparatus, light transmissivity and a viewing angle may be improved.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of this invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. An array substrate comprising:
a substrate having a gate line, a data line and a switching element electrically connected to the gate line and the data line;
a pixel electrode disposed in a pixel area of the substrate and electrically connected to the switching element, the pixel electrode including a connection part dividing the pixel area into a plurality of domains and slits extending from the connection part;
a supplementary electrode corresponding to at least a space between the slits of the pixel electrode; and
a first insulation layer formed on the data line and the switching element and a second insulation layer formed on the first insulation layer,
wherein the supplementary electrode is formed above the first insulation layer and the pixel electrode is formed on the second insulation layer, the supplementary electrode being electrically disconnected from the first insulation layer.

2. The array substrate of claim 1, further comprising an organic insulation layer formed between the first insulation layer and the second insulation layer,
wherein the supplementary electrode is formed between the organic insulation layer and the second insulation layer.

3. The array substrate of claim 1, wherein the supplementary electrode is formed in the pixel area and has a plate shape.

4. The array substrate of claim 1, wherein the supplementary electrode extends along a portion of a side portion of the pixel area along which end portions of the slits are arranged.

5. An LCD apparatus, comprising:
a first substrate including an upper substrate and a common electrode on an under surface of the upper substrate;
a liquid crystal layer under the common electrode; and
a second substrate including a lower substrate opposite to the upper substrate, the lower substrate having a gate line, a data line and a switching element electrically connected to the gate line and the data line, the liquid crystal layer being interposed between the upper substrate and the lower substrate, a pixel electrode in a pixel area of the lower substrate, the pixel electrode including a connection part dividing the pixel area into a plurality of domains and slits extending from the connection part, and a supplementary electrode corresponding to at least a space between the slits and applying an electric field to a portion of the liquid crystal layer in the space between the slits, wherein the second substrate further comprises:
a first insulation layer formed between the switching element and the supplementary electrode, the supplementary electrode being electrically disconnected from the first insulation layer; and
a second insulation layer formed between the supplementary electrode and the pixel electrode.

6. The LCD apparatus of claim 5, wherein the supplementary electrode is formed in the pixel area and has a plate shape.

7. The LCD apparatus of claim 5, further comprising a driver applying a pixel voltage to the pixel electrode and a supplementary voltage to the supplementary electrode, the supplementary voltage forming the electric field applied to the portion of the liquid crystal layer in the space between the slits.

8. The LCD apparatus of claim 7, wherein the driver applies pixel voltages which have opposite phases to each other to adjacent pixel electrodes, respectively, and applies supplementary voltages having phases which are the same as the pixel voltages to corresponding supplementary electrodes.

9. The LCD apparatus of claim 7, wherein the driver applies pixel voltages which have a same phase to adjacent pixel electrodes, respectively, and applies supplementary voltages having opposite phases to each other to corresponding supplementary electrodes to the adjacent pixel electrodes.

* * * * *